US010427556B2

(12) United States Patent
Bortolon et al.

(10) Patent No.: US 10,427,556 B2
(45) Date of Patent: Oct. 1, 2019

(54) BACKREST ADJUSTER FOR A VEHICLE SEAT

(71) Applicant: Faurecia Automotive Seating, LLC, Auburn Hills, MI (US)

(72) Inventors: Christopher A. Bortolon, Commerce Township, MI (US); John D. Newberry, Belleville, MI (US); John M. Perraut, Rochester Hill, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 89 days.

(21) Appl. No.: 15/613,869

(22) Filed: Jun. 5, 2017

(65) Prior Publication Data
US 2017/0349063 A1 Dec. 7, 2017

Related U.S. Application Data

(60) Provisional application No. 62/345,374, filed on Jun. 3, 2016.

(51) Int. Cl.
*B60N 2/22* (2006.01)
*B60N 2/23* (2006.01)
*B60N 2/64* (2006.01)
*B60N 2/02* (2006.01)

(52) U.S. Cl.
CPC .......... *B60N 2/2222* (2013.01); *B60N 2/233* (2013.01); *B60N 2/64* (2013.01); *B60N 2002/0236* (2013.01)

(58) Field of Classification Search
CPC ........ B60N 2/2222; B60N 2/64; B60N 2/233; B60N 2/22; B60N 200/0236
See application file for complete search history.

(56) References Cited

U.S. PATENT DOCUMENTS

| 5,082,326 | A | 1/1992 | Sekido |
| 6,273,810 | B1 | 8/2001 | Rhodes, Jr. |
| 6,283,547 | B1 | 9/2001 | Bauer |
| 9,884,574 | B2 | 2/2018 | Mizoi |
| 9,896,003 | B2 | 2/2018 | Tamura |
| 2007/0228790 | A1 | 10/2007 | Schurg |
| 2010/0244525 | A1* | 9/2010 | Ito .................. B60N 2/0232 297/353 |
| 2016/0096448 | A1 | 4/2016 | Line |
| 2016/0229316 | A1 | 8/2016 | Tamura |

FOREIGN PATENT DOCUMENTS

DE 10355519 A1 6/2005
EP 1839933 10/2007

OTHER PUBLICATIONS

Extended European Search Report for European App. No. 17179225.2 dated Apr. 5, 2018, 4079 EP II, 11 pages.
Partial European Search Report for European App. No. 17179225 dated Jan. 3, 2018, 4079 EP II, 14 pages.
Office Action dated Dec. 17, 2018 for U.S. Appl. No. 15/633,128, 4079 US-U II,(pp. 1-10).

* cited by examiner

*Primary Examiner* — D Glenn Dayoan
*Assistant Examiner* — Melissa A Black
(74) *Attorney, Agent, or Firm* — Barnes & Thornburg LLP

(57) ABSTRACT

A vehicle seat includes a seat bottom coupled to floor of a vehicle and a seat back coupled to the seat bottom to move relative to the seat bottom. The seat back includes a backrest and a backrest adjuster configured to move relative to the backrest to change a shape of the backrest.

20 Claims, 11 Drawing Sheets

BACKREST ADJUSTER FOR A VEHICLE SEAT

PRIORITY CLAIM

This application claims priority under 35 U.S.C. § 119(e) to U.S. Provisional Application Ser. No. 62/345,374, filed Jun. 3, 2016, which is expressly incorporated by reference herein.

BACKGROUND

The present disclosure relates to a vehicle seat, and particularly to a vehicle seat including a seat back. More particularly, the present disclosure relates to a seat back including a backrest and a backrest adjuster configured to move relative to the backrest.

SUMMARY

According to the present disclosure, a vehicle seat includes a seat bottom coupled to floor of a vehicle and a seat back coupled to the seat bottom to move relative to the seat bottom. The seat back includes a backrest and a backrest adjuster configured to move relative to the backrest to change a shape of the backrest.

In illustrative embodiments, a backrest adjuster includes a hinge coupled to the backrest, a moveable plate coupled to the hinge to pivot relative to the backrest, and a drive mechanism including an actuator. The actuator is movable to pivot the movable plate between a back position wherein the backrest is positioned proximate to the backrest and a forward position wherein the backrest is positioned forward of the backrest.

In illustrative embodiments, the backrest adjuster may further include a backrest support. The moveable plate may be coupled to the backrest support. The backrest support may pivot about the hinge. In some illustrative embodiments, the hinge may be a deformable grommet. The backrest support may have a vertical post positioned within the deformable grommet.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

Figure 12:
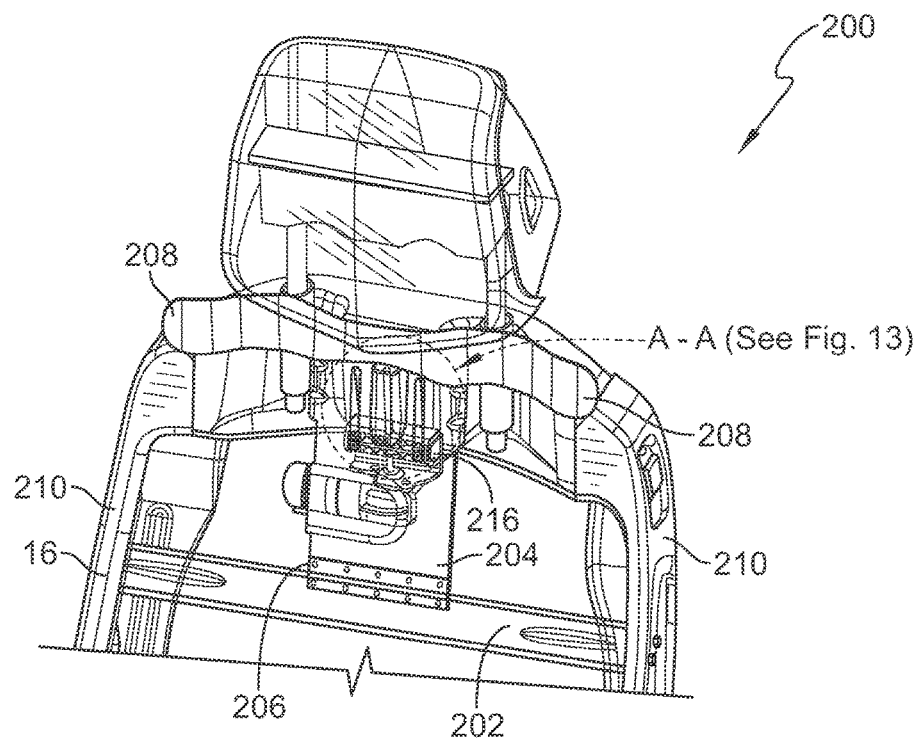
Figure 13:
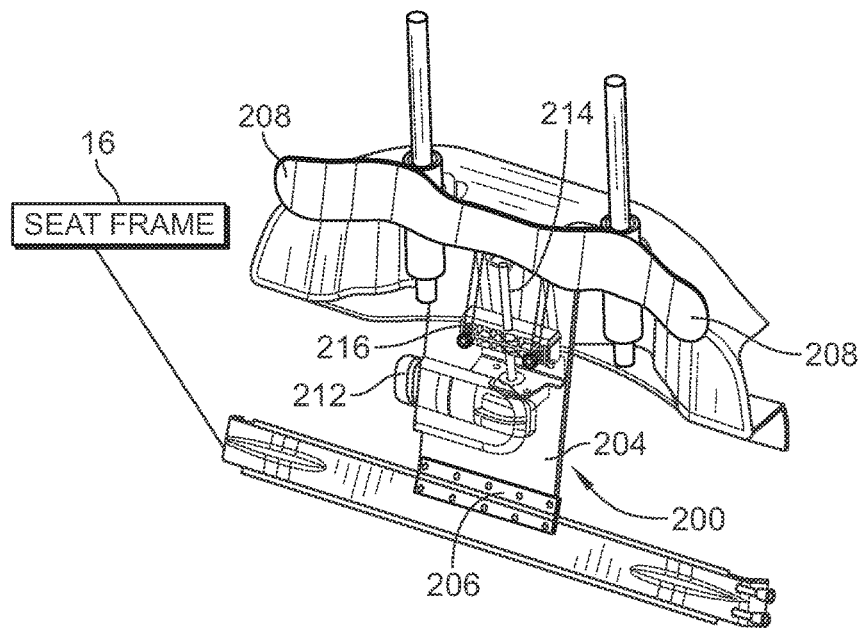
Figure 14:
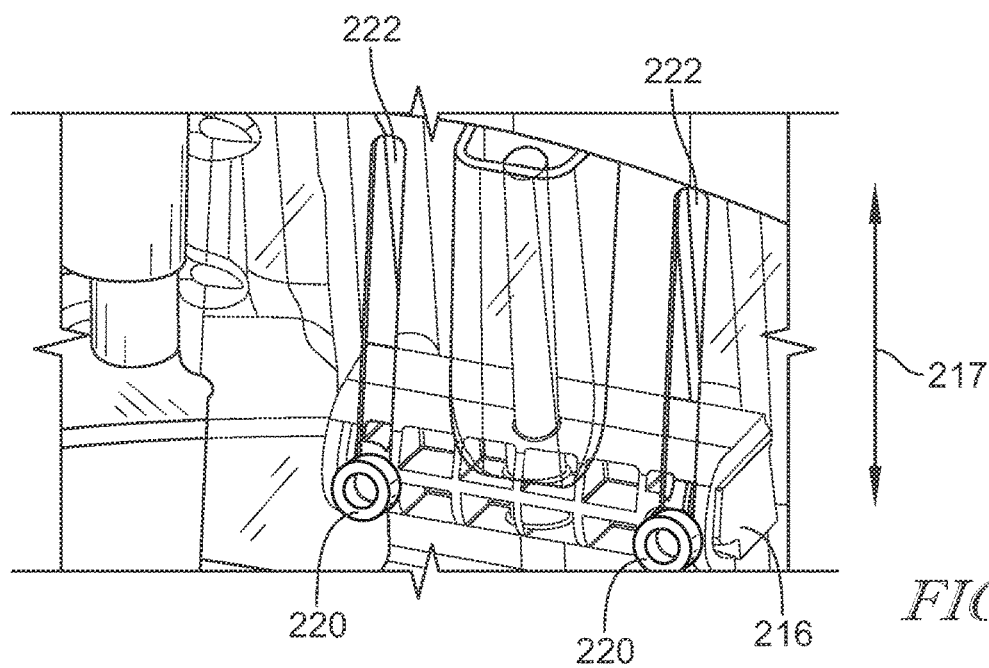
Figure 15:
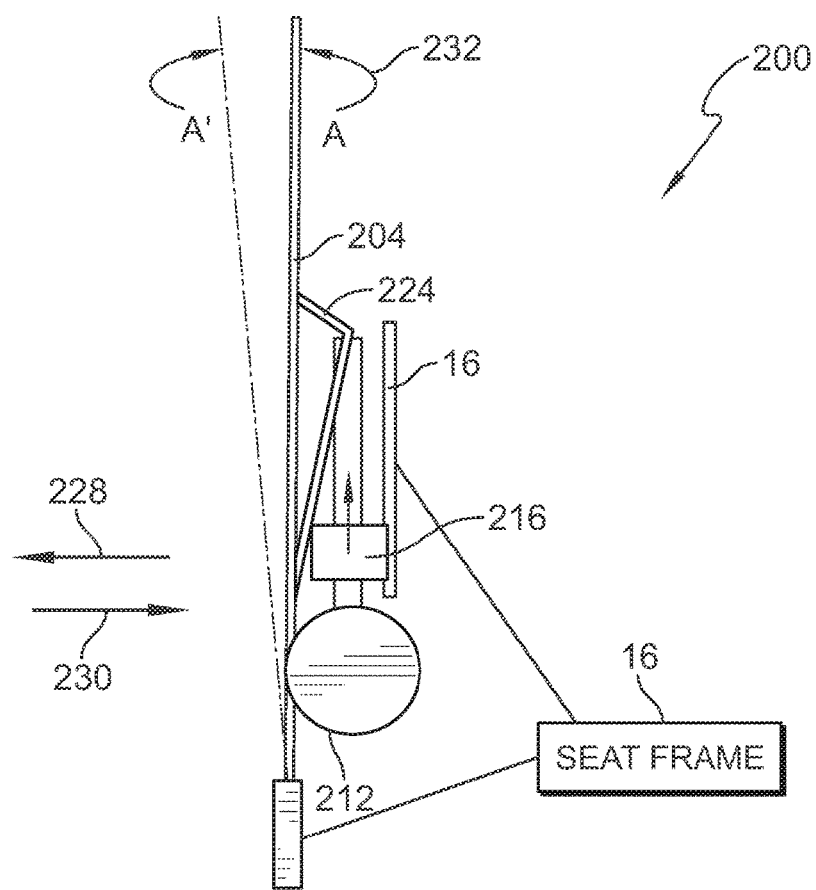
Figure 16:
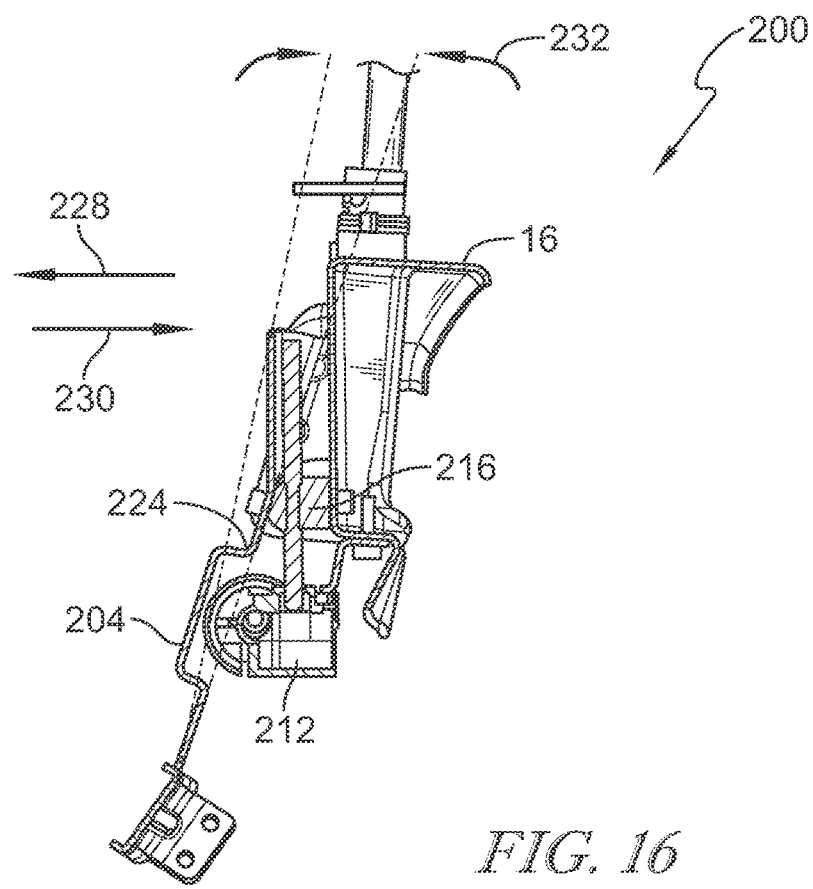
Figure 17:
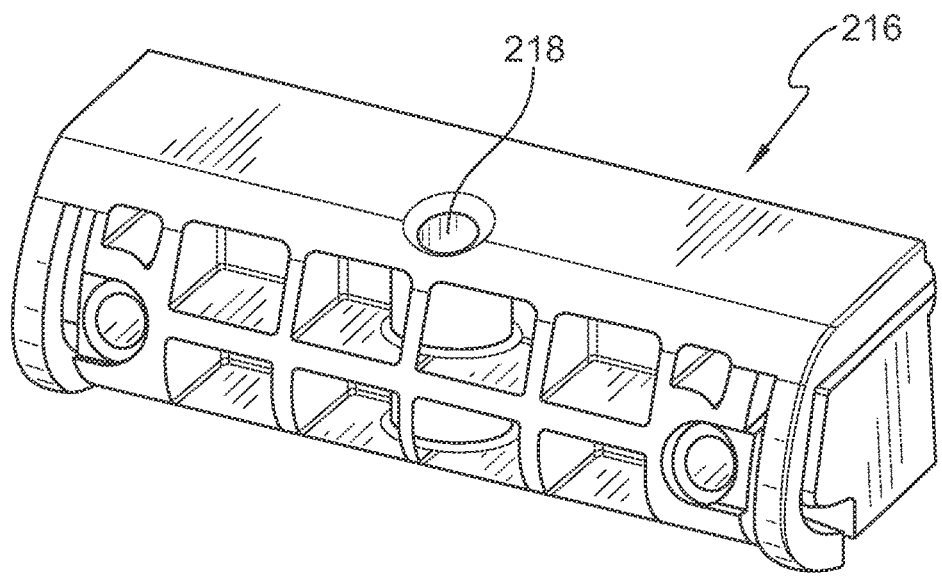

FIG. 12 is a front partial perspective view of another embodiment of a seat back in accordance with the present disclosure showing that a backrest adjuster of the seat back includes a cross plate secured to the seat frame, a hinge is coupled to the cross plate so that a backrest support may move freely with respect to the cross plate, a motor configured to actuate a wedge that moves the backrest support between a back position and a forward position;

FIG. 13 is a partial perspective view of the backrest adjuster of FIG. 12 showing that the motor is configured to actuate a wedge up and down in a vertical direction;

FIG. 14 is an enlarged partial perspective view of FIG. 12 showing the motor coupled to the wedge to cause the wedge to move vertically along the backrest support to move the backrest support between the back position and the forward position;

FIG. 15 is a diagrammatic view of the backrest adjuster of FIGS. 12-14 showing that the motor is coupled to the wedge and that the wedge moves vertically along the backrest support to move the backrest support between the back position and the forward position;

FIG. 16 is elevational view of the backrest adjuster of FIG. 12 showing a drive screw coupled to the motor and the wedge so that as the motor rotates the drive screw, the wedge moves vertically; and FIG. 17 is a perspective view of the wedge of FIG. 12 showing that the wedge includes a threaded opening extending therethrough to receive the drive screw therein.

DETAILED DESCRIPTION

Figure 1:
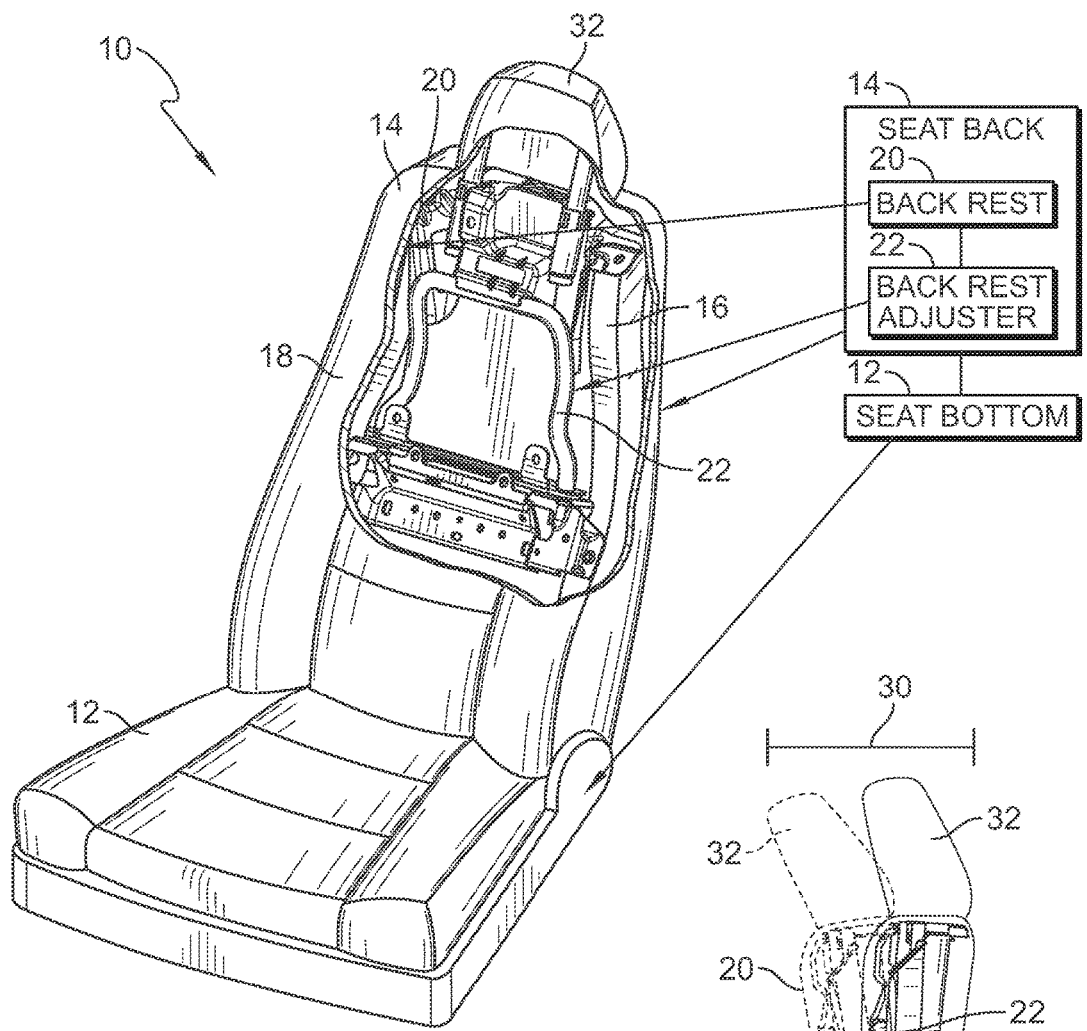
FIG. 1 is a perspective and diagrammatic view of a vehicle seat in accordance with the present disclosure with portions broken away to reveal that the vehicle seat includes a backrest adjuster coupled to a backrest frame of a seat back and suggesting that the backrest adjuster moves between a back position and a forward position as suggested in FIG. 2.

A vehicle seat 10 in accordance with the present disclosure includes a seat bottom 12 and a seat back 14 as shown in FIG. 1. The seat back 14 includes a backrest adjuster 22 which is configured to vary a size and shape of the seat back 14 to maximize support and comfort provided to a passenger resting in the vehicle seat 10. A first embodiment of a backrest adjuster 22 in accordance with the present disclosure is shown in FIGS. 1-6. A second embodiment of a backrest adjuster 120 in accordance with the present disclosure is shown in FIGS. 7-10. A third embodiment of a backrest adjuster 320 in accordance with the present disclosure is shown in FIG. 11. A fourth embodiment of a backrest adjuster 220 in accordance with the present disclosure is shown in FIGS. 12-17.

A vehicle seat 10 is configured to be secured to a floor of a vehicle (not shown) as suggested in FIG. 1. The vehicle seat 10 includes a seat bottom 12 and a seat back 14 extending upward from the seat bottom 12. The seat bottom 12 includes a frame (not shown) that is coupled to the floor of the vehicle. The seat back 14 includes a backrest frame 16 to which a trim 18 is attached. The trim 18 encases at least one cushion within the seat back. A backrest 20 is positioned within the seat back 14 behind the cushion. A backrest adjuster 22 is coupled to the backrest frame 16 and engages the backrest 20. In particular, the backrest adjuster 22 is configured to move the backrest 20 with respect to the backrest frame 16.

Figure 2:
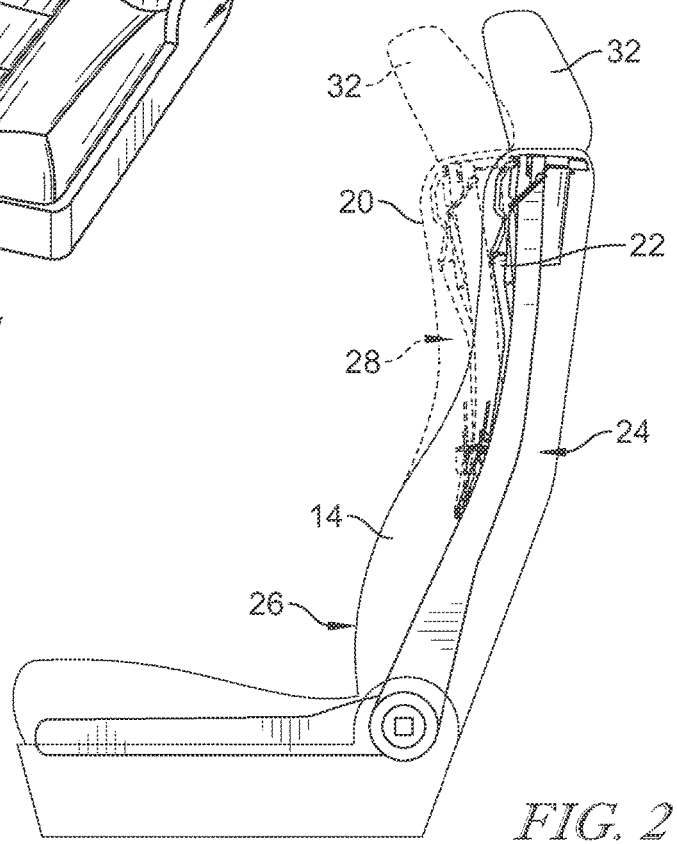
FIG. 2 is an elevational view of the vehicle seat of FIG. 1 showing the backrest adjuster in the back position (in solid lines) and suggesting the backrest adjuster moves to the forward position (in phantom lines) to define an angle between the back position and the forward position.

The seat back 14 is shown in a back position 24 as shown in FIG. 2. In the back position 24, the backrest 20 is positioned such that a surface 26 of the seat back 14 is substantially planar. The backrest adjuster 22 is moveable such that the backrest 20 moves forward to a forward position 28 as suggested in broken lines. In the forward position 28, the backrest 20 is positioned such that the surface 26 of the seat back 14 is pushed forward into a non-planar configuration. In the forward position 28, the backrest 20 is angled forward to an angle 30. It should be noted that the backrest 20 may angle forward to any desirable angle 30. Additionally, the backrest 20 may be moved to an intermittent angle between the back position 24 and the forward position 28. In the illustrated embodiment, a head rest 32 extending from the seat back 14 moves forward with the backrest 20. In other embodiments, the head rest 32 may not move with the backrest 20. Alternatively, the movement of the head rest 32 may be limited with respect to the movement of the backrest 20. That is, the backrest 20 may move to the angle 30 while the head rest 32 moves to a different angle that is less than or greater than the angle 30.

Figure 3A:
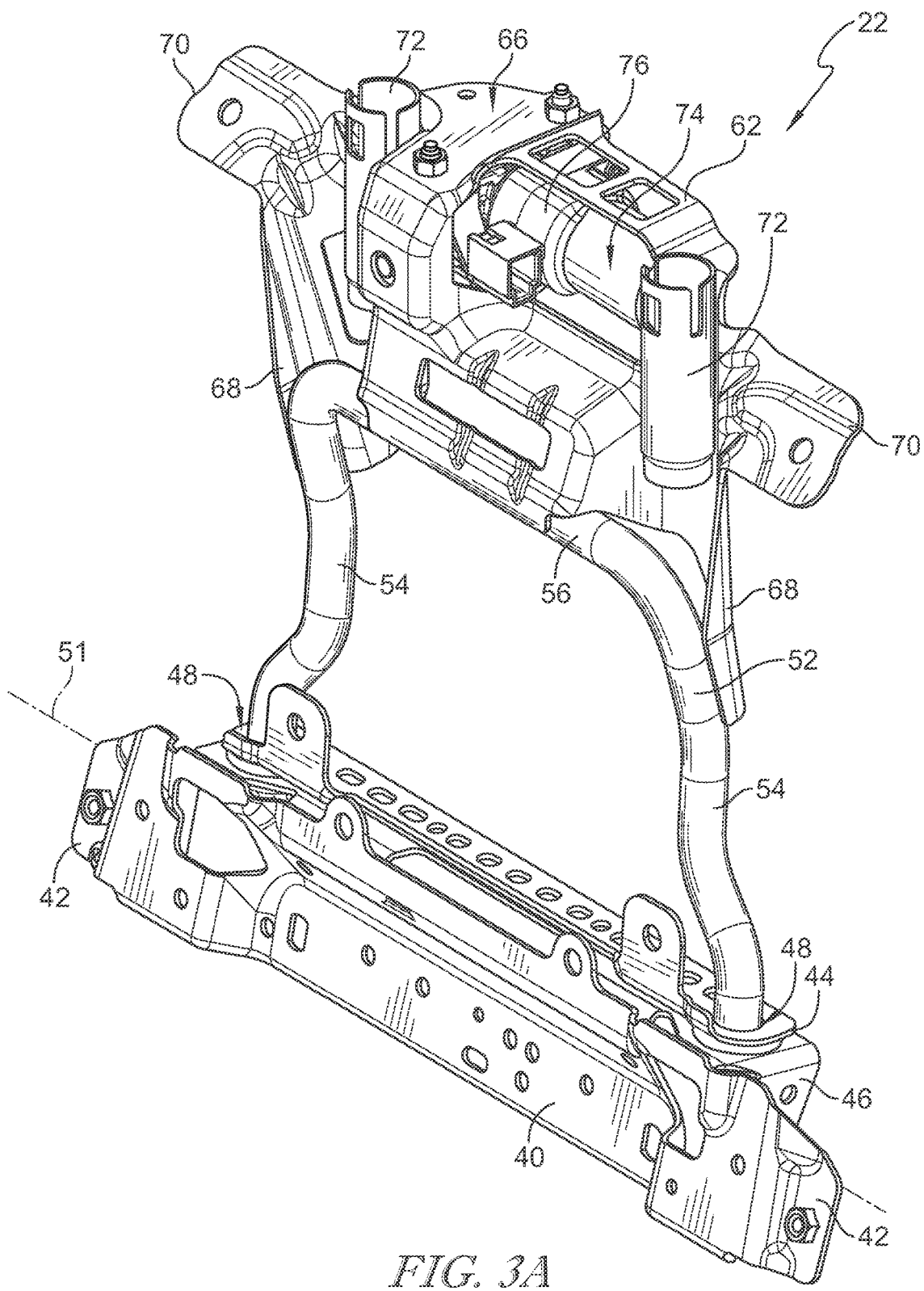
FIG. 3A is a perspective view of the backrest adjuster of FIGS. 1 and 2 showing that the backrest adjuster includes a cross plate that is coupled to the backrest frame, a hinge support that moves relative to the cross plate, and an upper plate that is actuated with a motor and supports an upper back of a passenger resting on the vehicle seat.
Figure 3B:
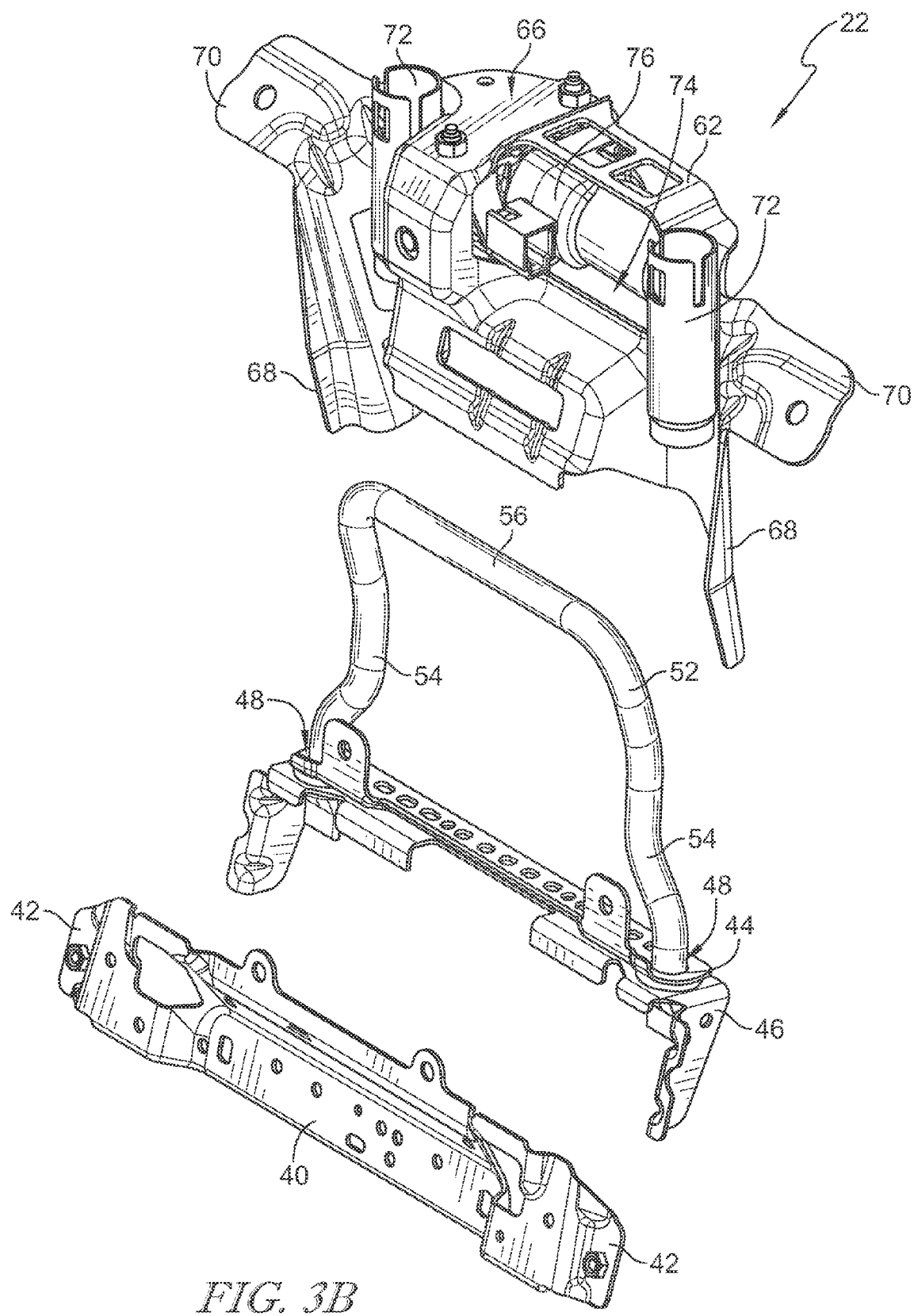
FIG. 3B is an exploded assembly view of the backrest adjuster of FIG. 3A showing that the backrest adjuster includes a cross plate that is coupled to the backrest frame, a hinge support that moves relative to the cross plate, and an upper plate that is actuated with a motor and supports an upper back of a passenger resting on the vehicle seat.

Referring to FIG. 3, the backrest adjuster 22 includes a cross plate 40 having a pair of ends 42. Each of the ends 42 is secured to the backrest frame 16. A hinge support 44 extends along a top 46 of the cross plate 40. The top 46 is formed to include openings 48 arranged to extend therethrough. A hinge 50 is positioned within each opening 48. The hinge 50 includes a deformable grommet that moves within the opening 48. A backrest support 52 extends from the hinge support 44. In one example, the backrest support 52 is generally U-shaped and includes a pair of vertical posts 54 joined by a horizontal post 56 at a top of each vertical post 54. A bottom of each vertical post 54 is secured within a respective hinge 50. Because the hinge 50 is deformable and moveable, the vertical posts 54, and consequently the backrest support 52, are moveable freely within the hinges 50 about an axis 51.

An upper plate 62 is secured to the backrest support 52. The backrest 20 is positioned in front of the upper plate 62. The upper plate 62 includes a body 66 having arms 68 extending therefrom. The arms 68 are secured to the vertical posts 54. The body 66 is secured to the horizontal post 56. The body 66 includes a pair of flanges 70 that are secured to the trim 18 of the vehicle seat 10. The body 66 also includes a pair of posts 72 extending upward therefrom. The posts 72 are configured to receive the posts (not shown) of the head rest 32 so that the head rest 32 is secured to the upper plate 62.

Figure 4:
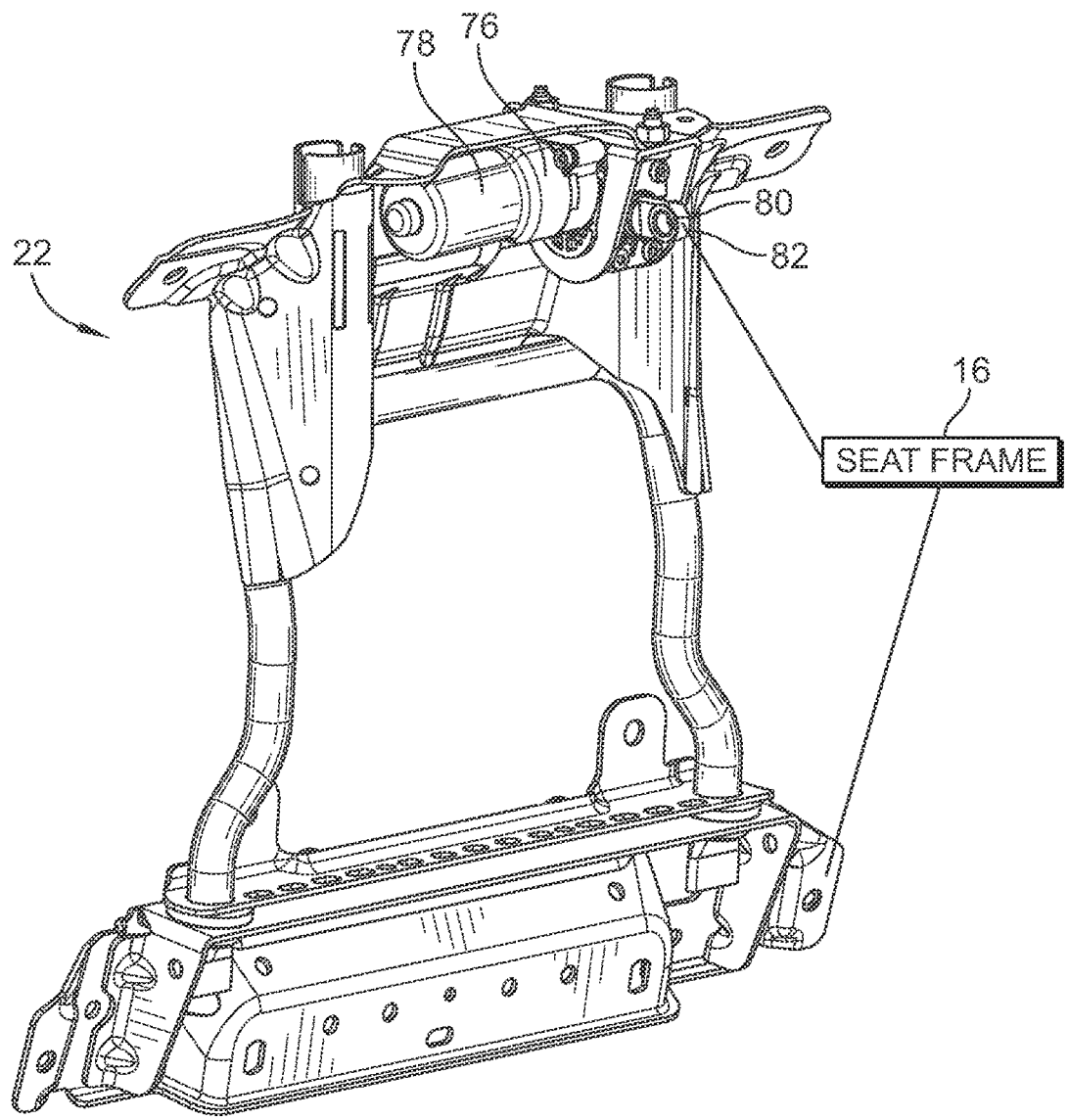
FIG. 4 is a rear perspective view of the backrest adjuster of FIG. 3 showing the motor and drive screw positioned behind and coupled to the upper plate of the backrest adjuster.
Figures 5, 6:
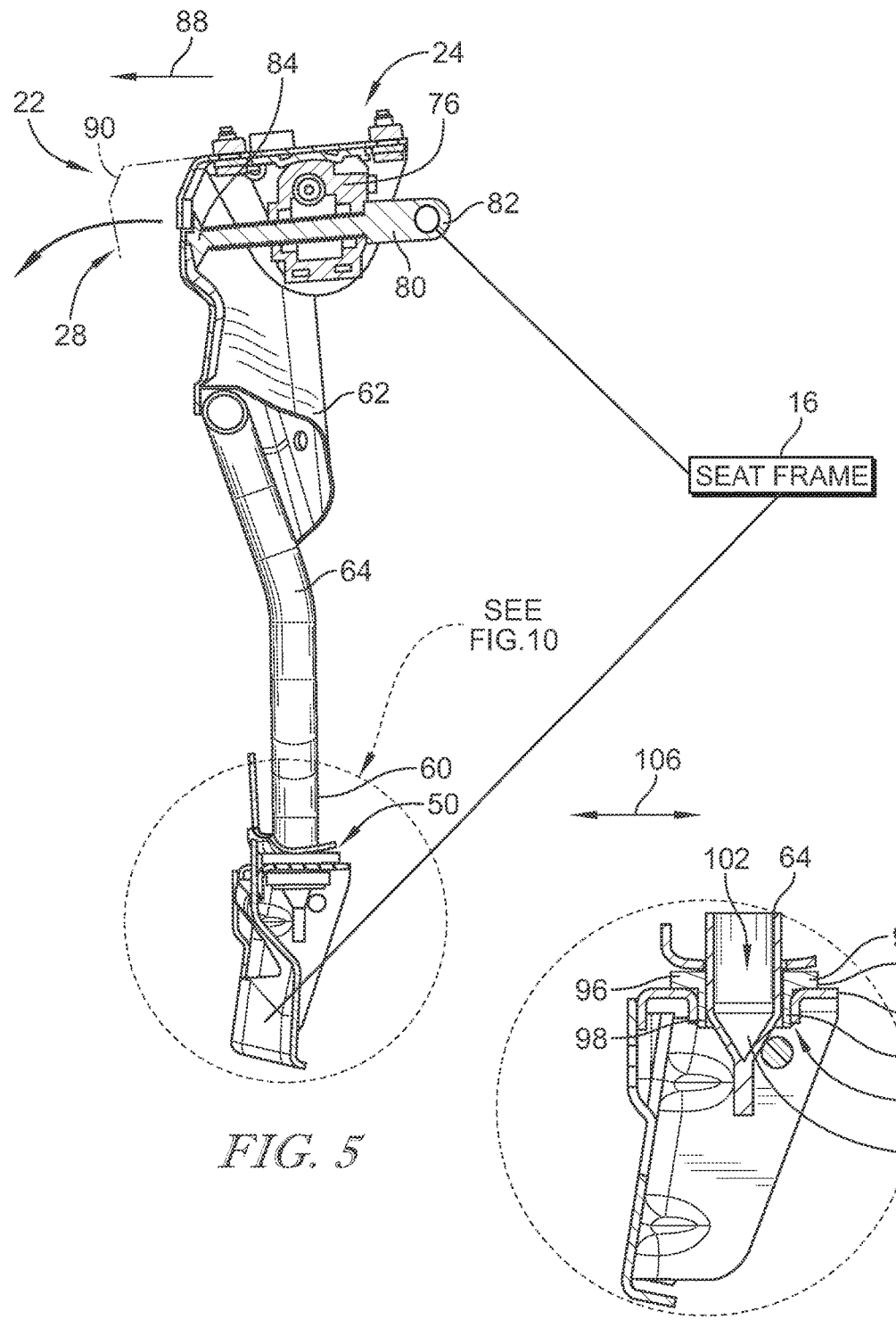
FIG. 5 is elevational view of the backrest adjuster of FIG. 3 showing the drive screw and motor coupled to the upper plate and a vertical post of the backrest support coupled to a hinge provided within the hinge support.
FIG. 6 is an enlarged portion of FIG. 5 showing the vertical post of the backrest coupled to the hinge provided within the hinge support, the hinge is positioned within an opening formed in the hinge support, and suggesting that the hinge is permitted to deform and move within the opening to enable movement of the backrest support.

A cavity 74 is formed in the body 66 and houses a motor 76. As described in more detail below, the motor 76 actuates the upper plate 62 with respect to the backrest frame 16. Particularly, the motor 76 actuates the upper plate 62 between the back position 24 and the forward position 28. Referring to FIG. 4, a body 78 of the motor 76 is coupled to the upper plate 62. A drive screw 80 extends from the motor 76. In the illustrative embodiment, the drive screw 80 is a horizontal screw that extends through the body 78 of the motor 76. An end 82 of the drive screw 80 is secured to the backrest frame 16. The end 82 of the drive screw 80 is secured to the backrest frame 16 so that the drive screw 80 can rotate with respect to the backrest frame 16. As illustrated in FIG. 5, another end 84 of the drive screw 80 is secured to the upper plate 62.

Accordingly, the motor 76 actuates the drive screw 80 such that the body 78 of the motor 76 moves along a threaded surface of the drive screw 80. The body 78 of the motor 76 is moved in the direction of arrow 88. Because the motor 76 is secured to the upper plate 62 and the end 84 of the drive screw 80 is secured to the upper plate 62, the upper plate 62 likewise moves in the direction of arrow 88, thereby moving the backrest adjuster 22 between the back position 24 and the forward position 28 as illustrated by the broken lines 90. The upper plate 62 is moveable to any intermediate position between the back position 24 and the forward position 28.

The bottom 60 of a vertical post 64 is illustrated positioned within the hinge 50 as shown in FIG. 5. An expanded view of the connection between the vertical post 64 and the hinge 50 is provided in FIG. 6. The hinge 50 includes a cylindrical body 92 and a flange 94 extending circumferentially around the cylindrical body 92. The flange 94 forms an upper surface 96 of the hinge 50. A lower surface 98 of the hinge 50 is defined at a bottom 100 of the hinge 50. A bore 102 extends through the hinge 50 from the upper surface 96 to the lower surface 98. The hinge 50 is positioned within the opening 48 such that the cylindrical body 92 extends through the opening 48 and the flange 94 rests on an upper surface 104 of the hinge support 44. The bottom 60 of the vertical post 64 extends through the bore 102 defined within the hinge 50 such that the bottom 60 of the vertical post 64 extends past the lower surface 98 of the hinge 50. Because the hinge 50 is deformable, the vertical post 64 can move in the direction of arrow 106. That is, when the drive screw 80 is actuated to the upper plate 62, the vertical posts 64 move within the deformable hinge 50 to enable the backrest adjuster 22 to move between the back position 24 and the forward position 28.

Figure 7:
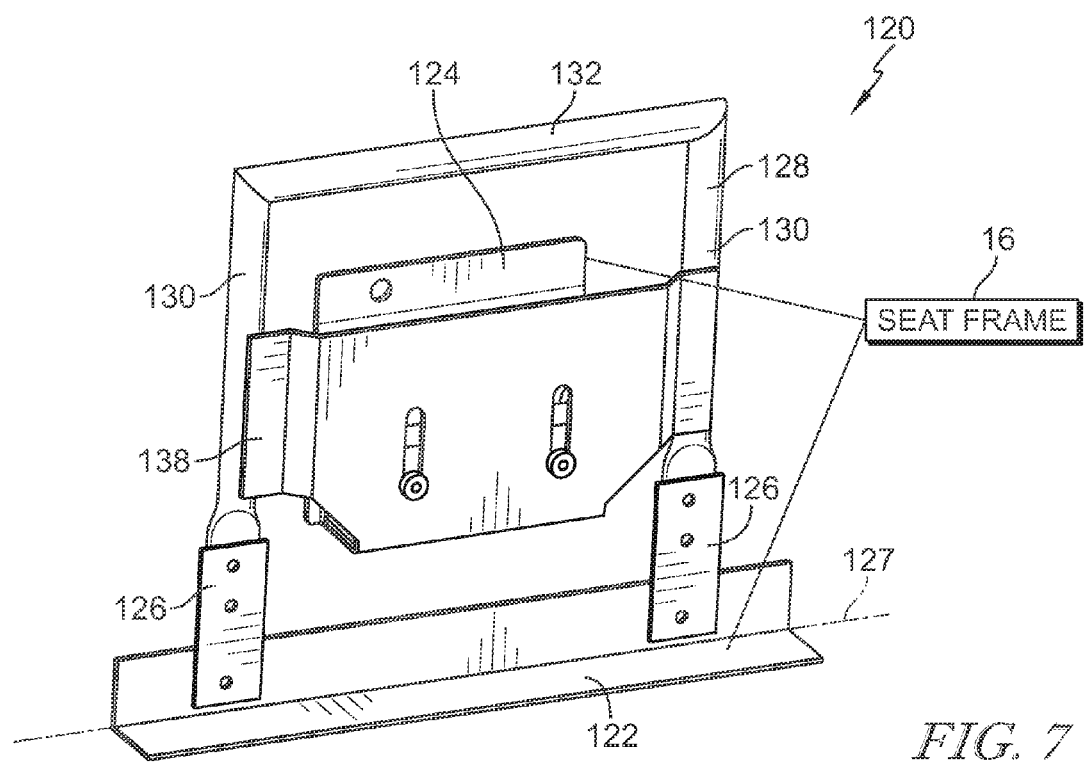
FIG. 7 is a front perspective view of another embodiment of a backrest adjuster in accordance with the present disclosure showing that the backrest adjuster includes a cross plate coupled to the backrest frame, a backrest support coupled to the cross plate by deformable tabs, and a backrest support is coupled to the deformable tabs and moves with an upper plate of the backrest adjuster.
Figure 8:
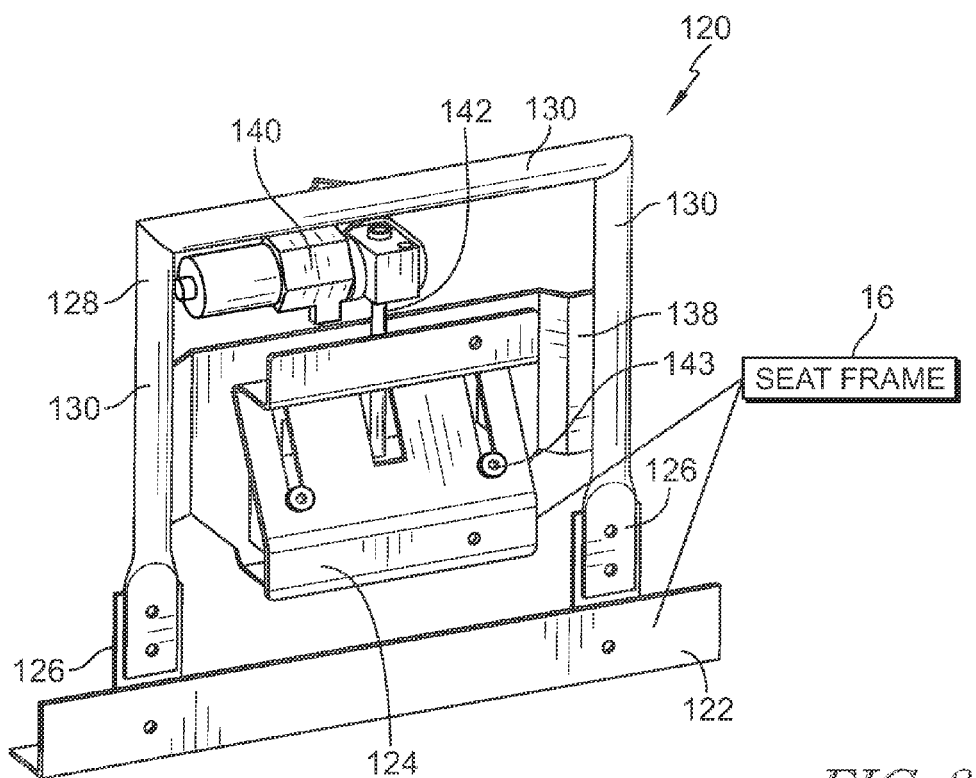
FIG. 8 is a rear perspective view of the backrest adjuster of FIG. 7 showing the motor coupled to the upper plate.

A backrest adjuster 120 in accordance with the present disclosure is shown in FIGS. 7 and 8. Backrest adjuster 120 includes a cross plate 122 that is secured to the backrest frame 16. An angled plate 124 is also coupled to the backrest frame 16. A pair of hinges 126 are coupled to the cross plate 122. Each hinge 126 includes a deformable tab. A backrest support 128 extends from the hinges 126. The backrest support 128 is generally U-shaped and includes a pair of vertical posts 130 joined by a horizontal post 132 at a top of each vertical post 130. A bottom of each vertical post 130 is secured to a respective hinge 126. Because the hinges 126 are deformable and moveable, the vertical posts 130, and consequently the backrest support 128, are moveable freely within the hinges 126 about an axis 127. An upper plate 138 extends between and is coupled to the vertical posts 130. The backrest 20 is positioned in front of the upper plate 138. The upper plate 138 moves with the backrest support 128. A motor 140 is secured to the backrest adjuster 120 and includes a drive screw 142. The motor 140 is positioned above the upper plate 138 and the drive screw 142 extends downward from the motor 140. The drive screw 142 extends vertically between the angled plate 124 and the upper plate 138.

Figure 10:
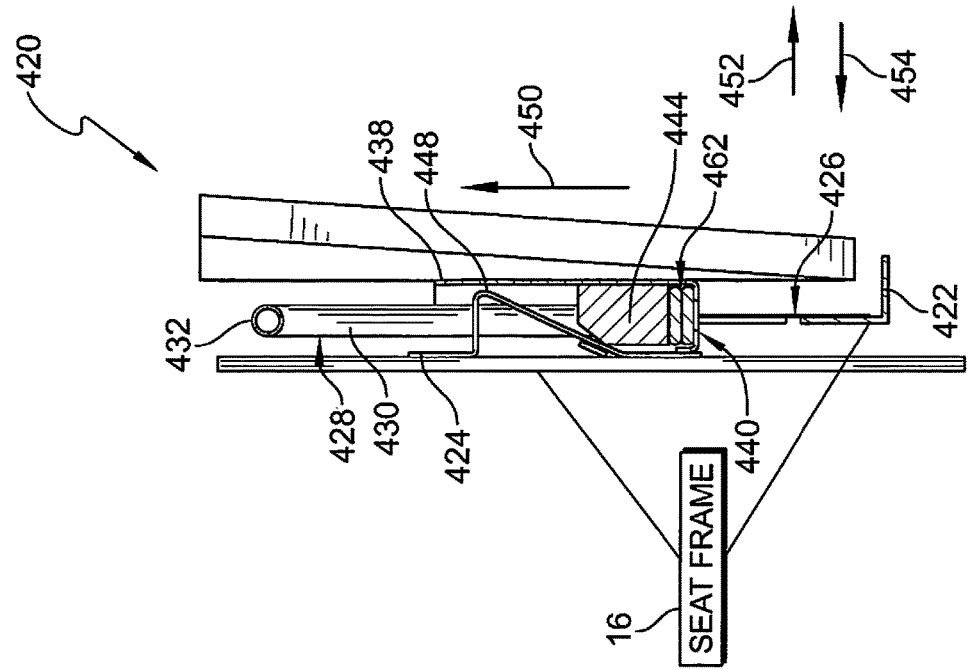
FIG. 10 is a view of another embodiment of a backrest adjuster showing that the flange moves the drive nut as the drive nut is actuated along the flange and movement of the drive nut moves the upper plate between a back position and a forward position.
Figure 9:
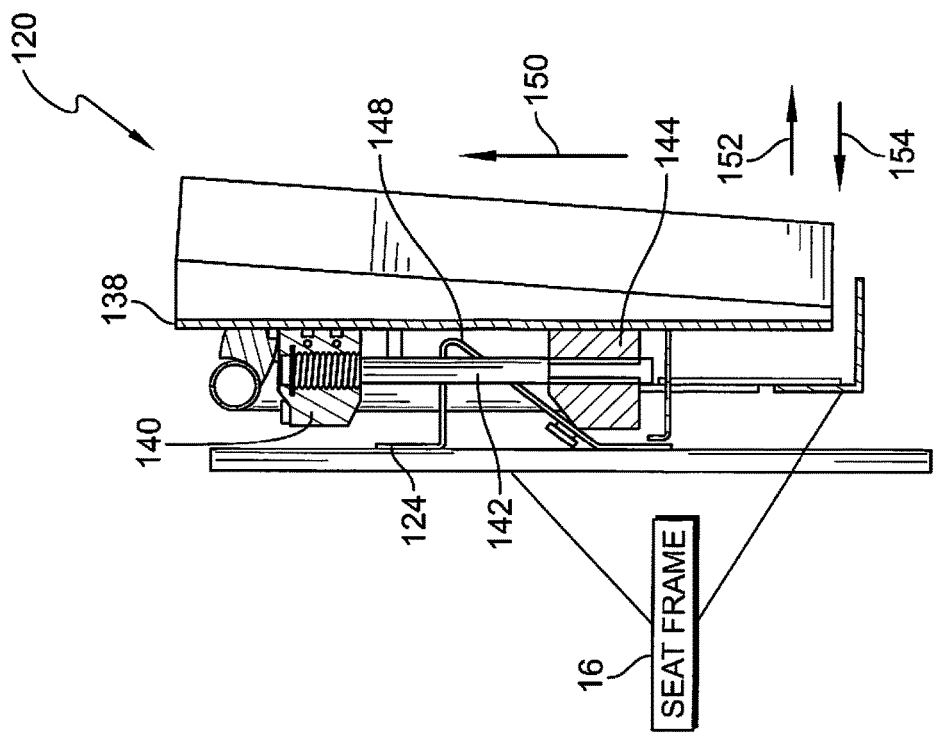
FIG. 9 is a partial elevational view of the backrest adjuster of FIG. 7 showing a motor coupled to the upper plate and having a drive screw that actuates a drive nut, an angled plate including a flange to move a drive nut as the drive nut is actuated along the flange, and movement of the drive nut moves the upper plate between a back position and a forward position.
Figure 11:
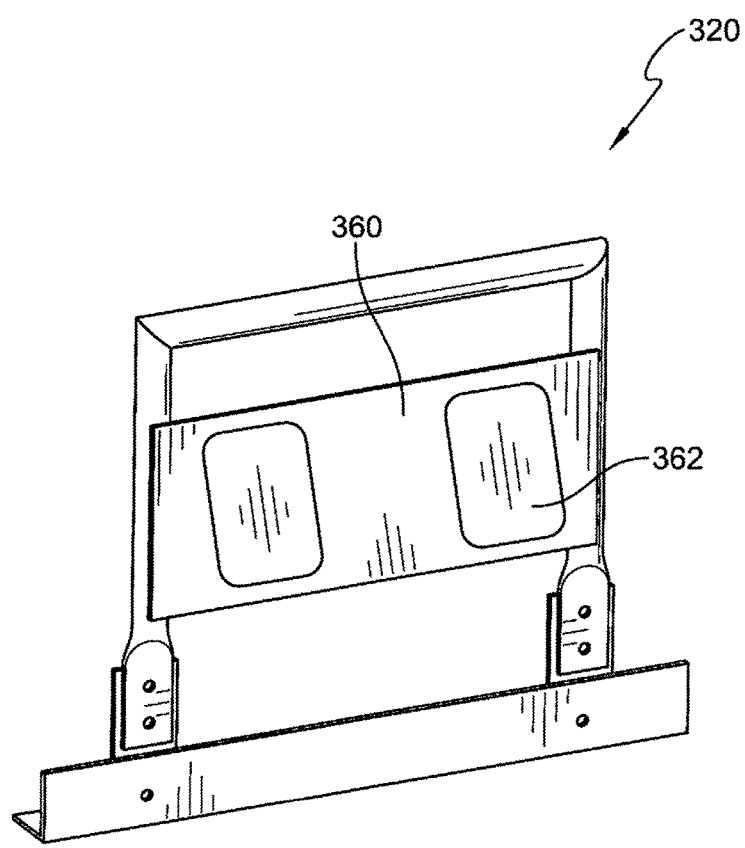
FIG. 11 is a front perspective view of another embodiment of a backrest adjuster in accordance with the present disclosure showing that the backrest adjuster includes inflatable bladders that move between a back position and a forward position.

A drive nut 144 is coupled to the drive screw 142 as shown in FIGS. 9 and 10. The drive screw 142 extends through a threaded opening in the drive nut 144. The drive nut 144 is positioned between the angled plate 124 and the upper plate 138. The angled plate 124 includes a flange 148 that extends from the backrest frame 16 toward the upper plate 138. As the drive screw 142 is actuated, the drive screw 142 moves the drive nut 144 vertically along slots 143, shown in FIG. 8, formed in the angled plate 124 in the direction of arrows 150. As the drive nut 144 moves upward (e.g. away from the seat bottom 12), the drive nut 144 moves along the flange 148 of the angled plate 124. The flange 148 is stationary and forces the drive nut 144 to move in the direction of arrow 152, thereby pushing the upper plate 138 outward from the back position 24 to the forward position 28 as the backrest adjuster 120 pivots on the deformable hinges 126.

Conversely, when the drive screw 142 is actuated in the opposite direction (e.g. toward the seat bottom 12), the drive nut 144 moves vertically downward and in the direction of arrow 154, thereby allowing the backrest support 128 to return from the forward position 28 to the back position 24. The backrest support 128 may be moved to an intermediate angle between the back position 24 and the forward position 28.

In some embodiments, the backrest adjuster 320 may include an upper plate 360 having inflatable bladders 362 thereon as suggested in FIG. 11. In such an embodiment, the upper plate 360 moves in a similar manner as the upper plate 138 described in FIGS. 7-10. The more the inflatable bladders 362 are blown up, the further the upper plate 360 bends forward. In addition to moving the upper plate 360 between the back position 24 and the forward position 28, the bladders 362 may be inflated or deflated to a desired level to add additional support.

Another embodiment of a backrest adjuster 420, in accordance with the present disclosure, is shown in FIG. 10. Backrest adjuster 420 includes a cross plate 422 that is secured to the backrest frame 16. An angled plate 424 is also coupled to the backrest frame 16. A pair of hinges 426 are coupled to the cross plate 422. Each hinge 426 includes a deformable tab. A backrest support 428 extends from the hinges 426. The backrest support 428 is generally U-shaped and includes a pair of vertical posts 430 joined by a horizontal post 432 at a top of each vertical post 430. A bottom of each vertical post 430 is secured to a respective hinge 426. Because the hinges 426 are deformable and moveable, the vertical posts 430, and consequently the backrest support 428, are moveable freely within the hinges 426. An upper plate 438 extends between and is coupled to the vertical posts 430. The backrest 20 is positioned in front of the upper plate 438. The upper plate 438 moves with the backrest support 428. A pneumatic actuation system 440 is secured to the backrest adjuster 420 and includes at least one air bladder 462.

A drive nut 444 is coupled to the pneumatic actuation system 440 as shown in FIG. 10. The drive nut 444 is positioned between the angled plate 424 and an upper plate 438. The angled plate 424 includes a flange 448 that extends from the backrest frame 16 toward the upper plate 438. Illustratively, two air bladders 462 are located under the drive nut 444. As the air bladders 462 are inflated, the drive nut 444 moves vertically along slots (not shown) formed in the angled plate 424 in the direction of arrows 450. As the drive nut 444 moves upward, the drive nut 444 moves along the flange 448 of the angled plate 424. The flange 448 is stationary and forces the drive nut 444 to move in the direction of arrow 452, thereby pushing the upper plate 438 outward from the back position 24 to the forward position 28 as the backrest adjuster 420 pivots on the deformable hinges 426.

Conversely, when the air bladders 462 are deflated, the drive nut 444 moves vertically downward and in the direction of arrow 454, thereby allowing the backrest support 428 to return from the forward position 28 to the back position 24. The backrest support 428 may be moved to an intermediate angle between the back position 24 and the forward position 28.

A backrest adjuster 200 includes a cross plate 202 that is secured to the backrest frame 16 as shown in FIGS. 12 and 13. An angled moveable plate 204 is also coupled to the cross plate 202 via a hinge 206. A backrest support 208 is coupled to the angled plate 204. The backrest support 208 extends horizontally between sides 210 of the backrest frame 16. The backrest 20 is positioned in front of the backrest support 208. A motor 212 is secured behind the angled plate 204 and includes a vertical drive screw 214 that extends upward from the motor 212. A wedge 216, shown in FIG. 17, is coupled the drive screw 214. Specifically, the drive screw 214 extends through a threaded opening 218 formed through the wedge 216. As shown in FIG. 14, the wedge 216 includes bolts 220 that extend through slots 222 formed in the angled plate 204. The bolts 220 are secured within the slots 222 and configured to slide therein so that the wedge 216 moves in the direction of arrows 217. The wedge 216 is positioned between the angled plate 204 and the backrest frame 16, as illustrated in FIGS. 15 and 16.

The angled plate 204 includes a flange 224 that extends toward the backrest frame 16 as shown in FIGS. 15 and 16. As the drive screw 214 is actuated, the drive screw 214 moves the wedge 216 vertically along the slots 222 formed in the angled plate 204 in the direction of arrows 226. As the wedge 216 moves upward (e.g. away from the seat bottom 12), the wedge 216 moves along the flange 224 of the angled plate 204. The wedge 216 forces the flange 224 to move in the direction of arrow 228, thereby pushing the angled plate 204 and the backrest support 208 outward from the back position 24 to the forward position 28 as the backrest adjuster 200 pivots on the hinge 206. Conversely, when the drive screw 214 is actuated in the opposite direction (e.g. toward the seat bottom 12), the wedge 216 moves vertically downward to allow the flange to move in the direction of arrow 230, thereby allowing the backrest support 208 to return from the forward position 28 to the back position 24. It should be noted that the backrest support 208 may be moved to an intermediate angle between the back position 24 and the forward position 28.

Vehicle seats generally include a seat and a seat back extending upward from the seat. The seat may be adjusted with respect to a floor of the vehicle. For example, the seat may be angled and/or moved forward or backward for comfort. Likewise, the seat back may also be adjusted. For example, the seat back may be reclined with respect to the seat.

The invention claimed is:

1. A vehicle seat comprising
a seat bottom adapted to couple to a floor of a vehicle to move relative to the floor of the vehicle,
a backrest frame coupled to the seat bottom and arranged to extend upwardly away from the seat bottom, and
a backrest adjuster including a hinge coupled to the backrest frame, a movable plate coupled to the hinge to move relative to the backrest frame and adapted to support an upper back of a passenger resting on the vehicle seat, and a drive mechanism arranged to extend between and interconnect the backrest frame and the movable plate to cause the movable plate to move between a back position in which a backrest is positioned proximate to the backrest frame and a forward position in which the backrest is positioned forward of the backrest frame,
wherein the backrest adjuster further comprises a backrest support arranged to extend between and interconnect the movable plate and the hinge and the backrest support moves with the movable plate between the back and forward positions,
wherein the hinge comprises a deformable grommet and a portion of the backrest support extends through an aperture formed in the deformable grommet.

2. The vehicle seat of claim 1, wherein the drive mechanism includes a motor coupled with the movable plate for movement with the movable plate relative to the backrest frame between the back position and the forward position.

3. The vehicle seat of claim 1, wherein the drive mechanism comprises an inflatable bladder coupled to the moveable plate.

4. A vehicle seat comprising
a seat bottom adapted to couple to a floor of a vehicle to move relative to the floor of the vehicle,
a backrest frame coupled to the seat bottom and arranged to extend upwardly away from the seat bottom, and
a backrest adjuster including a hinge coupled to the backrest frame, a movable plate coupled to the hinge to move relative to the backrest frame and adapted to support an upper back of a passenger resting on the vehicle seat, and a drive mechanism arranged to extend between and interconnect the backrest frame and the movable plate to cause the movable plate to move between a back position in which a backrest is positioned proximate to the backrest frame and a forward position in which the backrest is positioned forward of the backrest frame,
wherein the drive mechanism comprises a drive screw that moves the moveable plate with respect to the backrest frame,
wherein the drive screw rotates about an axis and the axis is arranged to extend up and down along the backrest frame,
further comprising a moveable body coupled to the drive screw, wherein the drive screw moves the moveable body up and down along the moveable plate to pivot the moveable plate between the back position and the forward position.

5. The vehicle seat of claim 4, wherein
the moveable body is moved away from the seat bottom to pivot the moveable plate into the forward position and
the moveable body is moved toward the seat bottom to pivot the moveable plate into the back position.

6. The vehicle seat of claim 5, wherein the moveable body includes at least one of a wedge or a drive nut.

7. The vehicle seat of claim 4, wherein the drive mechanism comprises a motor.

8. A vehicle seat comprising
a seat bottom adapted to couple to a floor of a vehicle to move relative to the floor of the vehicle,
a backrest frame coupled to the seat bottom and arranged to extend upwardly away from the seat bottom, and
a backrest adjuster including a hinge coupled to the backrest frame, a movable plate coupled to the hinge to move relative to the backrest frame and adapted to support an upper back of a passenger resting on the vehicle seat, and a drive mechanism arranged to extend between and interconnect the backrest frame and the movable plate to cause the movable plate to move between a back position in which a backrest is positioned proximate to the backrest frame and a forward position in which the backrest is positioned forward of the backrest frame,
wherein the moveable plate is pivotable to one of a plurality of intermediate positions between the back position and the forward position.

9. The vehicle seat of claim 8, wherein the backrest adjuster further comprises a backrest support arranged to extend between and interconnect the movable plate and the hinge and the backrest support moves with the movable plate between the back and forward positions.

10. The vehicle seat of claim 8, wherein the drive mechanism comprises a drive screw that moves the moveable plate with respect to the backrest frame.

11. The vehicle seat of claim 10, wherein the drive screw is one of a horizontal drive screw and a vertical drive screw.

12. The vehicle seat of claim 10, wherein the drive screw rotates about an axis and the axis is arranged to extend up and down along the backrest frame.

13. The vehicle seat of claim 8, further comprising an inflatable bladder coupled to the moveable plate.

14. The vehicle seat of claim 8, further comprising a seat cushion positioned over the backrest, the backrest pivoting the seat cushion when the backrest moves between the back position and the forward position.

15. A method of adjusting a backrest positioned within a seat back of a vehicle seat, the method comprising
coupling a hinge of a backrest adjuster to a backrest frame of the vehicle seat,
positioning a moveable plate of the backrest adjuster behind the backrest, wherein the moveable plate is pivotally coupled to the hinge,
coupling a drive mechanism to the moveable plate, and
actuating the drive mechanism to pivot the moveable plate along a path between a back position wherein the backrest is positioned proximate to the backrest frame and a forward position wherein the backrest is positioned forward of the frame, further comprising securing a moveable body to a drive screw, wherein actuating the drive mechanism further comprises actuating the drive screw to move the moveable body up and down along the moveable plate such that the moveable plate pivots between the back position and the forward position.

16. The method of claim 15, wherein the hinge includes a deformable grommet, the method further comprising coupling the moveable plate to a backrest support, securing the backrest support within the deformable grommet, and pivoting the backrest support about the deformable grommet.

17. A method of adjusting a backrest positioned within a seat back of a vehicle seat, the method comprising coupling a hinge of a backrest adjuster to a backrest frame of the vehicle seat, positioning a moveable plate of the backrest adjuster behind the backrest, wherein the moveable plate is pivotally coupled to the hinge, coupling a drive mechanism to the moveable plate, and actuating the drive mechanism to pivot the movable plate along a path between a back position wherein the backrest is positioned proximate to the backrest frame and a forward position wherein the backrest is positioned forward of the frame, pivoting the moveable plate to one of a plurality of intermediate positions between the back position and the forward position.

18. The method of claim 15, further comprising moving the moveable body up to pivot the moveable plate into the forward position, and moving the moveable body down to pivot the moveable plate into the back position.

19. The method of claim 17, wherein actuating the drive mechanism further comprises actuating a drive screw to cause the drive screw to rotate about an axis which is arranged to extend generally perpendicular to the path.

20. The method of claim 17, further comprising operating an inflatable bladder coupled to the moveable plate.

* * * * *